United States Patent [19]

Arigaya et al.

[11] Patent Number: 4,559,249
[45] Date of Patent: Dec. 17, 1985

[54] SLIDING MEMBER AND A METHOD FOR MANUFACTURING THE SAME

[75] Inventors: Hideto Arigaya, Tanashi; Yoshihiro Katsui, Wako; Kikuo Sumiyoshi; Eiji Sato, both of Fujisawa; Kingo Miyasaka, Ayase, all of Japan

[73] Assignees: Honda Giken Kogyo Kabushiki Kaisha; Oiles Industry Co., Ltd., both of Tokyo, Japan

[21] Appl. No.: 543,932

[22] Filed: Oct. 20, 1983

[30] Foreign Application Priority Data

Nov. 5, 1982 [JP] Japan .................... 57-193395

[51] Int. Cl.[4] .................... F16C 27/02; F16J 15/12
[52] U.S. Cl. .................... 428/36; 428/240; 428/241; 428/242; 428/244; 428/247; 428/251; 428/253; 428/256; 428/262; 428/408; 264/258; 264/320; 264/324; 264/512; 264/516; 277/12; 277/30; 277/230; 277/234; 277/235 R; 277/DIG. 6; 285/94; 285/422; 285/423; 285/DIG. 10; 285/DIG. 11; 308/5 R; 308/6 R; 308/6 B; 308/DIG. 8
[58] Field of Search .................... 277/DIG. 6, 12, 30, 277/230, 234, 235 R; 285/DIG. 10, DIG. 11, 94, 422, 423; 308/5 R, 6 R, 6 B, DIG. 8; 428/288, 290, 36, 240, 241, 242, 244, 247, 251, 253, 256, 262, 408; 264/258, 320, 324, 512, 516

[56] References Cited

U.S. PATENT DOCUMENTS

| | | | |
|---|---|---|---|
| 2,924,471 | 2/1960 | Poltorak | 277/230 |
| 3,151,015 | 9/1964 | Griffith | 308/DIG. 8 |
| 3,404,061 | 10/1968 | Shane et al. | |
| 3,677,879 | 7/1972 | D'Andrea | 308/DIG. 8 |
| 3,726,738 | 4/1973 | Gellon et al. | 428/408 |
| 3,950,599 | 4/1976 | Board | 308/DIG. 8 |
| 4,080,233 | 3/1978 | McCloskey et al. | 308/DIG. 8 |
| 4,209,177 | 6/1980 | Hall | |
| 4,214,761 | 7/1980 | Pippert | 277/230 |
| 4,234,638 | 11/1980 | Yamagoe et al. | 428/408 |
| 4,309,474 | 1/1982 | Hodes et al. | 308/DIG. 8 |
| 4,317,575 | 3/1982 | Cavicchio | 277/DIG. 6 |
| 4,333,975 | 6/1982 | Booth | 428/408 |
| 4,417,733 | 11/1983 | Usher | 285/DIG. 11 |
| 4,423,544 | 1/1984 | Kashmerick et al. | 277/DIG.6 |
| 4,455,334 | 6/1984 | Ogino et al. | 428/36 |
| 4,462,603 | 7/1984 | Usher et al. | 264/324 |
| 4,463,959 | 8/1984 | Usher et al. | 264/324 |
| 4,514,458 | 4/1985 | Thorn et al. | 428/36 |
| 4,516,782 | 5/1985 | Usher | 285/DIG. 11 |

FOREIGN PATENT DOCUMENTS 2031074 4/1980 United Kingdom .
1602989 11/1981 United Kingdom .

*Primary Examiner*—James C. Cannon
*Attorney, Agent, or Firm*—LeBlanc, Nolan, Shur & Nies

[57] ABSTRACT

A sliding member is provided which comprises a base body made of a firmly entangled and collapsed metal fine wire, with the voids formed between the metal fine wires constituting the metal mesh being filled compactly with a heat resistant material, the sliding surface of the base body being formed into a smooth surface with either a lubricant that fills a number of small holes formed in the heat resistant material as well as covering the surface thereof or the lubricant and the metal fine wires being exposed. A manufacturing method of the same is also disclosed which basically comprises the steps of preparing a metal mesh as a reinforcing material, preparing a sheet-like heat resistant material with a plurality of small holes being formed through the thickness, applying a lubricant on the sheet-like heat resistant material in a given thickness so as to simultaneously fill the small holes, putting the sheet-like heat resistant material on the metal mesh to provide a laminate in which the lubricant is directed towards the sliding surface to be formed, convoluting the laminate about a cylindrical mandrel so as to represent a cylindrical preform and putting the preform in a metal die to axially compress it to provide the final product.

13 Claims, 12 Drawing Figures

4,559,249

SLIDING MEMBER AND A METHOD FOR MANUFACTURING THE SAME

BACKGROUND OF THE INVENTION

The present invention relates to a sliding member and more particularly to a sliding member having heat resistance. The present invention relates also to a method for manufacturing the same.

At this point, it is to be noted that throughout the Specification and claims the term "sliding member having heat resistance" is used to designate a product that is capable of carrying a load with a relatively low coefficient of friction even under conditions in which the application of normally utilized lubricants is difficult due to high temperatures and at the same time exhibits a sealing function, e.g. bearing bushes, washers, sliding plates, contact type packings, etc.

Hitherto, as sliding members of this kind those that have been publicly known have metallic materials made of stainless steel or copper alloy within which are embedded solid lubricant pellets, or nonmetallic materials such as graphite, or ceramics, etc., or compound materials such as the so-called cermet, etc., or heat resistant plastic material such as polytetrafluoroethylene (PTFE), polyimide, etc.

However, although all of those known materials are superior in heat resistance they have problems in friction and wear under dry friction conditions, and difficulties in mechanical strength, in particular resistance to impact, not necessarily having good conformability with mating members, and also problems in that they cannot exhibit their function sufficiently in regard to minute slippages.

In order to resolve those problems or difficulties, e.g. as disclosed in U.S. Pat. No. 3,404,061 or Japanese Patent Publication No. 23,966/1969, a technique to manufacture a sliding member has been developed in which the sliding member is manufactured by shaping expanded graphite, which is obtainable by a special treatment of graphite, together with reinforcing materials. Although this sliding member reveals superior heat resistance and its impact strength is remarkably improved compared with conventional sliding members, the coefficient of friction is somewhat higher than that of conventional sliding members and it also has a defect in that it often makes abnormal frictional noises under dry friction conditions.

Further, sliding members which are obtained by shaping mica or asbestos together with reinforcing materials also have been publicly known, but they have similar problems and difficulties.

This is thought to reside in the fact that in these members the difference between the coefficient of static and dynamic friction is large, and that they possess somewhat soft characteristics, etc. It is also conceivable that the shapes of the respective parts constituting the sliding system and the natural vibrations of the materials influence these problems.

Some of the present inventors have already proposed a sliding member in order to resolve the problems as above described in Japanese patent application No. 120,701/1981 which member has a lubricating property appropriate for use over a wide temperature range from room to high temperatures and which is characterized in that the surface of a basic sliding member which is obtainable by shaping heat resistant material together with metal meshes comprised of woven or knitted metal filaments as reinforcing material, is covered with lubricating compounds, and they confirmed that it, generally fulfils the expected objectives.

SUMMARY OF THE INVENTION

It is a principal object of the present invention to provide a sliding member which can further improve the various properties of the sliding material already proposed by some of the present inventors as described above.

It is an object of the present invention therefore to provide a sliding member which is suitable to be used under conditions in which the application of lubricating materials such as lubricating oil or wax or the like is not allowed, or in other words suitable for use under dry frictional conditions over a wide temperature range e.g. from room to high temperatures.

It is another object of the present invention therefore to provide a sliding member which does not make abnormal frictional noises even though it is used under such conditions as above described.

It is a further object of the present invention therefore to provide a sliding member which can reveal superior frictional properties even though it is used under such conditions as above described.

It is a still further object of the present invention to provide a sliding member which easily conforms with a mating member and simultaneously has a sealing function.

It is also an object of the present invention to provide a method for manufacturing a sliding shifting member in accordance with the present invention.

In accordance with the present invention a sliding member is provided which comprises a base body made of a firmly entangled and collapsed metal fine wire, with the voids formed between the metal fine wires constituting the metal mesh being filled compactly with a heat resistant material, the sliding surface of the base body being formed into a smooth surface with either a lubricant that fills a number of small holes, formed in the heat resistant material as well as covering the surface thereof or the lubricant and the metal fine wires being exposed. In a preferred aspect of the present invention the metal fine wires are selected from the group comprising austenitic or ferritic stainless steel, copper-nickel alloy, copper-nickel-zinc alloy, brass, beryllium copper, aluminium alloy, and the like, singularly or in combination, the heat resistant material being sheet-like expanded graphite, and the lubricant being polytetrafluoroethylene.

According to the present invention a method for manufacturing the sliding member is provided which comprises the steps of preparing a reinforcing material in the form of metal meshes which are made by weaving or knitting metal fine wires so as to have a band-like shape or to be a metal mesh sleeve; preparing a sheet-like heat resistant material; forming a number of small holes in the thickness of the heat resistant material, applying a lubricant on one of the surfaces of the heat resistant material in a given thickness and simultaneously also filling the small holes; then (A) in the case of the band-like wire mesh, putting the sheet-like heat resistant material on the band-like metal mesh to constitute a band-like laminate, subsequently either (a) putting on one or more of another heat resistant materials each of which is constituted by putting or applying on another metal mesh a sheet-like, powder-formed or slurry-formed heat resistant material with the sheet-like heat resistant material of the band-like laminate being directed towards the sliding surface, thereby resulting in a rectangular preform, or (b) to spirally convolute the band-like laminate itself so as to result in a cylindrical preform, and (B) in the case of the metal mesh sleeve, winding the sheet-like heat resistant material around the outer periphery of the wire mesh sleeve so as to result in a cylindrical laminate, folding back said cylindrical laminate from one end so as to result in a ring-shaped preform; succeedingly in both cases (A) and (B), inserting the rectangular or cylindrical or ring-shaped preform into a metal die; and compressing the rectangular, cylindrical or ring-shaped preform in the lamination or axial direction to be shaped into a final product in the metal die.

The most characteristic aspect of the present invention resides in that as the sheet-like heat resistant material sheet-like expanded graphite is selected, and as the lubricant polytetrafluoroethylene is adopted.

More specifically, as stated above, the sliding member according to the present invention is fundamentally constituted by a band-like shaped metal mesh or a metal mesh sleeve which is obtainable by weaving or knitting metal fine wires as a reinforcing material and a sheet-like heat resistant material which is formed with a number of small holes in its thickness and has a lubricant applied on one surface in a given thickness so as to simultaneously fill the small holes, whereby the reinforcing material and the sheet-like heat resistant material are put one upon another so as to provide a band-like or cylindrical laminate, whereby (A) in the band-like laminate as a reinforcing material either (a) a band-like metal mesh or a band-like metal mesh which is obtained by radially crushing a metal mesh sleeve is used, and this laminate is shaped so as to resemble a rectangular laminate by putting it on one or more of another laminates which are constituted by putting or applying a sheet-like or powder-formed or slurry-formed heat resistant material on another metal mesh so that the lubricant applied to the heat resistant material of the laminate is directed towards the sliding surface, or (b) the band-like laminate itself is spirally convoluted so as to provide a cylindrical preform, and (B) as for the cylindrical laminate it is constituted by winding a sheet-like heat resistant material applied with a lubricant around the outer or inner periphery of the metal mesh sleeve, the cylindrical laminate being folded back from one end to form a ring-shaped preform, and the preform obtained by either one of the procedures (A) or (B) is put into a metal die the cavity of which corresponds to the dimension and shape of a final product, and compressed and shaped therein in the direction of the lamination, the axis of the convolution, or the axis of the cylindrical laminate.

Thus, as a sheet-like heat resistant material applied with a lubricant sheet-like expanded graphite provided with a number of small holes in thickness is utilized with its surface having polytetrafluoroethylene (hereinafter referred to as "PTFE") applied as the lubricant in a given thickness together with the small holes being filled with PTFE (this treatment being hereinafter referred to as a "PTFE treatment"), and in the preform the surface applied with PTFE occupies the outermost layer which constitutes the sliding surface. In this case, in addition to the laminate comprising the reinforcing material and the PTFE treated sheet-like heat resistant material, either another assembly composed of a metal mesh identical to that of the reinforcing material or differing from that another sheet-like heat resistant material, or another laminate comprised by applying on a similar reinforcing material a powder-formed or slurry-formed heat resistant material and applying pressure thereon or simultaneously drying it so as to have the reinforcing material and the heat resistant material be integrally connected together, may be incorporated with any layer as an additional layer to constitute a layer other than the one forming the sliding surface.

BRIEF DESCRIPTION OF THE DRAWINGS

These and other objects of the present invention will become more apparent upon reading the following description and upon reference to the attached drawings illustrating several embodiments of the present invention, in which.

DESCRIPTION OF THE PREFERRED EMBODIMENTS

Figure 1:
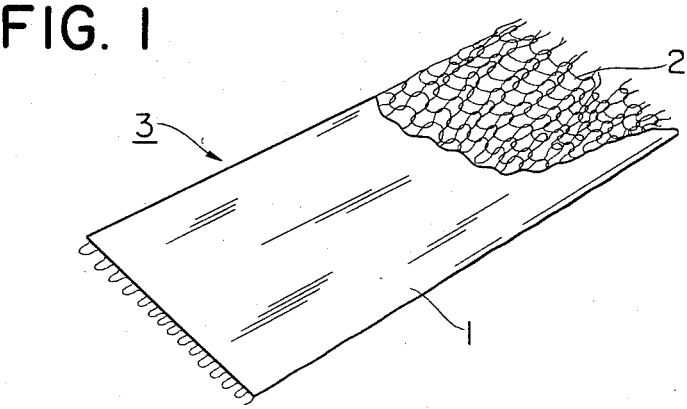
FIG. 1 is a perspective view illustrating a typical form of a laminate constituting one of the fundamental elements of a sliding member in accordance with the present invention, comprising PTFE treated sheet-like expanded graphite and a metal mesh as a reinforcing material on which the graphite is disposed.
Figure 2:
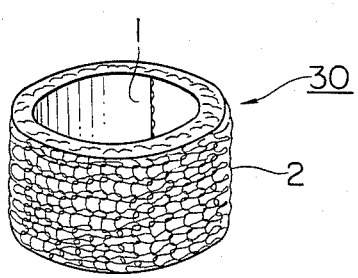
FIG. 2 is a perspective view illustrating a cylindrical preform obtained by convoluting the laminate shown in FIG. 1.
Figure 3:
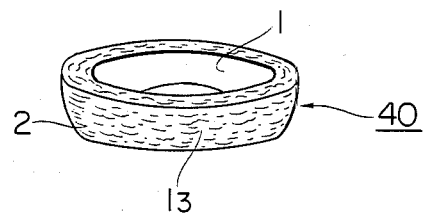
FIG. 3 is a perspective view of a sliding member obtained by compressing the preform shown in FIG. 2 along the axis of convolution so as to be shaped to a final desired product.

Referring now to FIG. 1 of the attached drawings wherein a PTFE treated, e.g. rectangular band-shaped, sheet-like heat resistant material 1 has its PTFE applied surface (in the embodiment shown it is the rear surface as viewed in FIG. 1) put on a similar rectangular band-shaped metal mesh 2 as a reinforcing material which is obtained by weaving or knitting metal fine wires, resulting in a rectangular laminate 3. The laminate 3 thus formed is then convoluted around a suitable cylindrical mandrel with the sheet-like heat resistant material 1 inside so that a cylindrical preform 30 is provided as shown in FIG. 2. Following this step, the preform 30 is put into a metal die the cavity of which corresponds to the shape and dimension of the final product, and compressed along the direction of the lamination, i.e. the axis of the convolution to be shaped to as for example the spherical-shell shaped sliding member 40 as shown in FIG. 3. On the outer periphery constituting the sliding surface in this sliding member 40 the reinforcing material 2 is exposed in a mesh-like pattern, and the voids formed between the metal wires are filled with the PTFE and the expanded graphite $1_3$ as the lubricant which has been generated by the destruction of the sheet-like heat resistant material 1, forming a smooth surface as a whole, while the cross section has such a structure that the metal fine meshes from which the metal mesh as the reinforcing material 2 has been formed are firmly entangled with each other and the heat resistant material tightly fills the voids formed around them.

Figure 4:
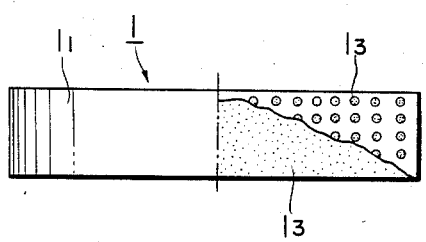
FIG. 4 is a partial sectional plan view of PTFE treated sheet-like expanded graphite constituting the sheet-like heat resistant material as shown in FIG. 1.
Figure 5:
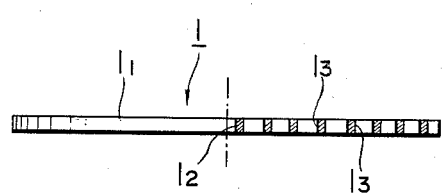
FIG. 5 is a side elevational view of the expanded graphite shown in FIG. 4, partially sectioned longitudinally.

More specifically, the PTFE treated sheet-like heat resistant material 1 has a constitution as shown in FIGS. 4 and 5. That is, the sheetlike expanded graphite 1 having e.g. a rectangular shape and a thickness of 0.1 to 1.0 mm is formed with a number of small holes $1_2$ in its thickness at intervals of 2 to 6 mm, the diameter of the holes $1_2$ being e.g. 0.3 to 1.5 mm, and the PTFE $1_3$ is applied such that the PTFE simultaneously fills all of the small holes $1_2$ In this case, in the embodiment shown in FIGS. 1 to 3 the metal mesh 2 as the reinforcing material confronts the PTFE $1_3$ applied on one of the surfaces of the sheet-like heat resistant material 1. Further, in this case, it is not necessary as a rule for the sheet-like expanded graphite $1_1$ to have both its surfaces applied with the PTFE $1_3$. Instead the application on only one surface and yet over a length sufficient enough to surround the cylindrical preform 30 for at least one winding is sufficient. (See FIG. 4).

Figure 6:
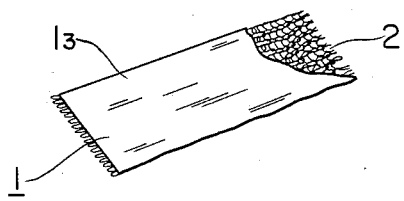
FIG. 6 is a perspective view illustrating another form of the laminate comprised by putting the PTFE treated sheet-like expanded graphite on the metal mesh.
Figure 7:
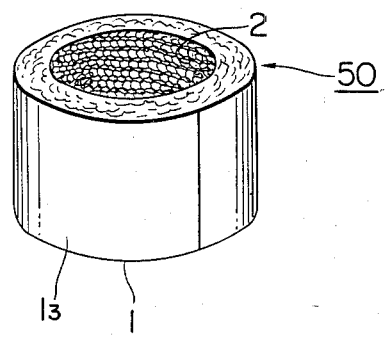
FIG. 7 is a perspective view illustrating a cylindrical preform obtained by convoluting the laminate shown in FIG. 6.

FIG. 6 illustrates another form of the laminate. That is, this laminate is constituted such that the PTFE treated rectangular sheet-like heat resistant material 1 has its non-treated surface (the rear side as viewed in FIG. 6) put on the rectangular band-like metal mesh as the reinforcing material, and the laminate is spirally convoluted around a cylindrical mandrel with the metal mesh 2 inside, whereby a cylindrical preform 50 as shown in FIG. 7 is provided.

Figure 8:
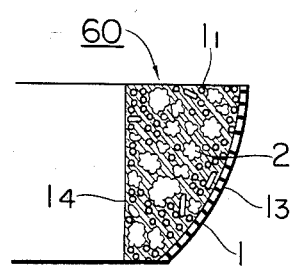
FIG. 8 is a partial longitudinal sectional view of the preform shown in FIG. 7 on a larger scale.

When this preform 50 is put into a metal die and compressed in the direction of the lamination so as to shape a desired final product, a sliding member 60 in which no reinforcing material 2 is exposed on the sliding surface, i.e. the outer periphery, is obtained as shown in FIG. 8 in a longitudinal sectional view on a larger scale. As can be seen from FIG. 8, on the outer periphery which forms the sliding surface in this sliding member 60 the PTFE treated heat resistant material 1 is exposed in a compressed state with the outer surface being covered with a thin layer of PTFE $1_3$.

Figure 9:
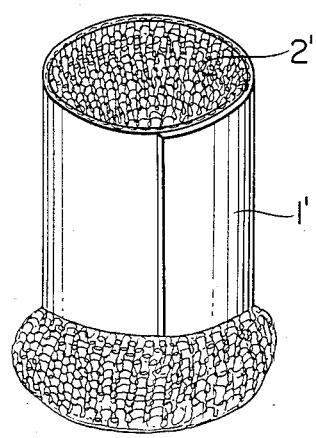
FIG. 9 is a perspective view illustrating a still further form of a laminate in which PTFE treated sheet-like expanded graphite surrounds the outer periphery of a metal mesh sleeve as a reinforcing material.
Figure 10:
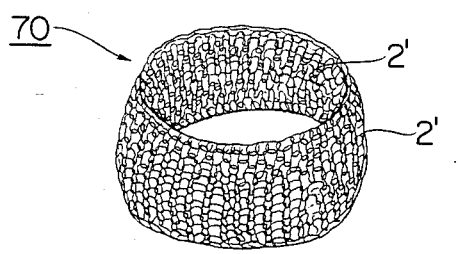
FIG. 10 is a perspective view illustrating a ring-shaped preform which is obtained by folding back the laminate shown in FIG. 9 from one end.
Figure 11:
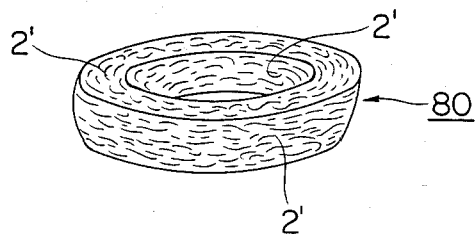
FIG. 11 is a perspective view of a sliding member which is obtained by compressing the preform shown in FIG. 10 along the line of its axis.

As a modification of the fundamental procedures for manufacturing a sliding member in accordance with the present invention, as shown in FIG. 9 a metal mesh 2′ which is comprised by knitting metal fine wires in a sleeve form and cutting it to an appropriate length, has wound around its outer periphery a PTFE applied surface confronting the metal mesh 2′, and the laminate thus prepared is folded back axially from one end so that the metal mesh 2′ inside the laminate is exposed outside as shown in FIG. 9. Thus, the laminate is transformed to exhibit a ring-shaped (or doughnut-shaped) configuration depending upon the length of the fold back of the metal mesh as shown in FIG. 10, resulting in a ring-shaped preform 70 having a somewhat tall height. In this case, in the preform 70 having a sheet-like heat resistant material 1′ and the metal mesh 2′ exist as alternate layers, the metal meshes 2′ occupying the inner and outer peripheries as well as both ends, surrounding the sheet-like heat resistant materials 1′. When the ring-shaped preform 70 having such a constitution is put into a metal die, and compressed in the axial direction to provide a final desired product a sliding member 80 in accordance with the present invention is obtained as shown in FIG. 11. In the sliding member 80, the reinforcing material 2′ is distributed regularly over the whole of the outer surface, and the PTFE and the expanded graphite continuously fill the voids formed between the metal fine wires constituting the reinforcing material 2′, exhibiting a smooth outer surface as a whole.

Also in this case, the PTFE treatment may be carried out only at the end portion of the parts to be folded back so that the PTFE treated portion appears around the inner and outer peripheries for at least one turn thereof, respectively.

Further, although it has been referred to that in FIG. 9 the heat resistant material 1′ is disposed around the knitted metal sleeve mesh 2′, instead the heat resistant material 1′ may be disposed inside the metal mesh 2′ so as to come into contact therewith. However, in such a constitution of the laminate, since as the folding back of the assembly progresses the cylindrical part which has not yet been subjected to the folding back is folded back the diameter increases owing to its subjection to radial tension, in such a constitution of the laminate, it is important that either the heat resistant material 1′ is disposed so as to be somewhat overlapped in the peripheral direction, or the heat resistant material 1′ is formed in a narrow ribbon-shape so that it can be spirally wound inside the metal mesh 2′. Therefore, as the diameter increases due to the folding back the heat resistant material 1′ there easily follows it.

Figure 12:
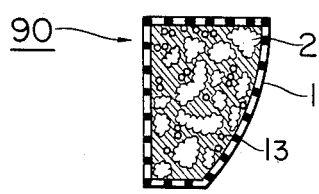
FIG. 12 is partial longitudinal sectional view on a larger seale of a sliding member similar to that shown in FIG. 11, obtained through similar procedures but from a preform in which PTFE treated sheet-like expanded graphite is disposed inside the metal mesh sleeve so as to come into contact with its inner periphery, in contrast to the laminate shown in FIG. 9.

Quite similar to the procedure of obtaining a sliding member 80 as shown in FIG. 11 from the ring-shaped preform 70 shown in FIG. 10, the preform just described above can produce a sliding member having a somewhat different constitution through the same procedures. FIG. 12 shows the sliding member 90 obtainable by such procedures, in a longitudinal sectional view on a larger scale. As can be seen from FIG. 12, in this sliding member 90 the PTFE treated heat resistant material 1 is exposed over the whole of the outer surface so that the PTFE $1_3$ is disposed on the outer surface, with no metal mesh 2′ exposed.

In the above manufacturing method the compressive or shaping pressure for the preforms 30, 50 or 70 is advantageously selected to be 2 to 2.5 t/cm$^2$.

The sliding member in accordance with the present invention can be manufactured by the above procedures. The following is a more specific description of the principal components of the present invention.

A. Reinforcing Materials

As the metal for the metal fine wires constituting the reinforcing material, austenetic stainless steel such as defined by the Japanese Industrial Standard ("JIS") under the classifications SUS 304, 316, or ferritic stainless steel such as JIS SUS 403 are used as the ferrous material, and copper-nickel alloy (white copper), copper-nickel-zinc alloy (German silver), brass, or beryllium copper, or the like are used as the non-ferrous material and also it is possible to use aluminium alloy.

The diameter of the metal fine wire is suitably about 0.1 to 0.5 mm, and as the reinforcing material the metal wire is applied in the form of a woven or knitted metal mesh, and in the shape of a band-like or cylindrical, i.e. sleeve metal mesh. The preferable void of the metal mesh formed between the metal wires is preferably on the order of 3 to 6 mm.

B. Heat Resistant Materials

As the heat resistant material expanded graphite, asbestos, mica, etc. are used, and they are preferably applied in the form of a sheet, as powder or as a slurry. Among these, although the sheet-like expanded graphite may be used either at the outermost layer and inside the reinforcing material, the expanded graphite and other materials in the form of powder or slurry can be used only inside the reinforcing material.

Thus, as the outermost sheet-like heat resistant material which finally forms the sliding surface the expanded graphite is necessarily used. As the sheetlike expanded graphite at present that are now on the market, those under the trade name "Grafoil", sold by Union Carbide of the U.S.A. or those under the name "Nikafilm", sold by Nippon Carbon Co., Ltd., are suitable, preferably with a thickness of about 0.2 to 1.0 mm.

As previously stated, when sheetlike expanded graphite is used as the outermost layer a number of small holes of about 0.3 to 1.5 mm in diameter should be formed through the thickness of the sheet at intervals of about 2 to 6 mm.

For the asbestos, filamental powders of a crysotile or amosite base, or asbestos paper or sheets made of these filamental powders are used.

The mica is preferably powders of natural or synthesized mica, or mica paper which is made by bonding these powders with silicon resin.

Further, when these heat resistant materials are in the form of powder or slurry, they are used as a band-like material in which after these heat resistant materials are spread on or applied to the metal mesh as the reinforcing material they are pressed together, or pressed and dried so as to become an integral substance. In this case, the metal mesh for the reinforcing material, may be identical to the reinforcing material for the surface layer, but, in general, it is preferable that a metal mesh of stainless steel be used regardless of the kind of reinforcing mateial to be used as the surface layer.

C. Lubricants

As the lubricant polytetrafluoroethylene (PTFE) is used.

If as the PTFE the PTFE dispersion agent (solid constituent being 65 wt %) such as sold under the trade name "Teflon 30J" by Mitsui Fluorochemicals Co., Ltd. is used the application work is facilitated.

That is, on the surface of the sheet-like expanded graphite in the thickness of which a number of small holes are formed the PTFE dispersion agent is (a) sprayed, or (b) brushed, or (c) applied by rollers, etc., and the thickness of the coating (after the solvent has been vaporized) is on the order of $10^{-2}$ mm, or on the order of $10^{-1}$ mm at the maximum. In this case, the PTFE should also fill the small holes formed in the sheet-like expanded graphite. When the thus coated sheet-like expanded graphite is heated at a temperature of 120° C. for several minutes, the solvent is completely vaporized, and with this treatment a PTFE film is formed on the surface of the sheet-like expanded graphite so firmly that the film cannot be easily peeled off by a usual treatment.

Also it is conceivable that as the PTFE a slurry form which is applied by mixing the minute powders of the PTFE sold under the trade name "PTFE Fine Powder" by Mitsui Fluorochemicals Co., Ltd. in water or volatile dispersing agent can be used, but in this case, a small amount of adhesive may be mixed or dissolved in the dispersing agent.

D. Others

As described above the PTFE treated sheet-like expanded graphite is combined with a metal mesh as a reinforcing material to form a laminate, and the graphite is located on the sliding surface at the outermost layer of the laminate, and in this case, a metal mesh as a reinforcing material singularly or with a sheet-like heat resistant material being put thereon can be interposed inside the assembly which constitutes the sliding surface.

Alternatively, in place of the metal mesh last mentioned a metal mesh to which is applied a heat resistant material in the form of a powder or slurry which is made by the procedure as explained in item (B) above may be utilized.

Next the results of the experiments which were carried out to prove the superiority of the sliding member in accordance with the present invention over the conventional ones will be explained.

In accordance with the present invention sliding members were manufactured such that a plurality of expanded graphite sheets to constitute the sliding surfaces, each having a thickness of 0.4 mm, were formed with a number of small holes in their thickness, each having a diameter of 1.5 mm, so that the ratios of the total area of the holes relative to the whole surface area varied from 3 to 50%, and the PTFE dispersion agent ("Teflon 30J" of Mitsui Fluorohemicals Co., Ltd.) was applied to the surface so as to also fill the small holes, and then the sheet-like graphite was heated at 120° C. to remove the volatile matters.

The sliding members thus prepared were subjected to an oscillation test under the following conditions to measure the coefficient of friction ($\mu$), wear amount and abnormal frictional noise.

| Test Conditions | |
| --- | --- |
| Mating Member: | SUS 304 |
| Load (kg/cm$^2$): | 20 |
| Oscillatory Velocity: (cycle/min) | 20 |
| Temperature (°C.): | 100 |
| Time Period (hrs): | 100, 300, 500, 1,000 |

The criterion of the abnormal frictional noise was defined as follows:

I: Only normal frictional sounds are generated, no abnormal noise being made;

II: When the ear is positioned near the test piece, in addition to the frictional sound, abnormal frictional noise is faintly heard;

III: Although at a definite position (1.5 m apart from the test piece) abnormal frictional noise is hard to identify due to the existence of sounds in the living environment it can be recognized by the tester; and IV: At a definite position anyone can recognize the abnormal frictional noise (unpleasant sound).

The test results are given in the Table.

TABLE

| | Test Period (hrs) | | | | | | | | | | | |
|---|---|---|---|---|---|---|---|---|---|---|---|---|
| | 100 | | | 300 | | | 500 | | | 1,000 | | |
| Sliding Surface | Coeff. of Friction ($\mu$) | Wear Amount (mm) | Noise | Coeff. of Friction ($\mu$) | Wear Amount (mm) | Noise | Coeff. of Friction ($\mu$) | Wear Amount (mm) | Noise | Coeff. of Friction ($\mu$) | Wear Amount (mm) | Noise |
| Single Graphite Sheet | 0.12 | 0.05 | IV | 0.12 | 0.14 | IV | — | — | — | — | — | — |
| 20–25$\mu$ PTFE Film Surface Thickness | 0.06 | 0.018 | I | 0.06~0.12 | 0.08 | I / IV | — | — | — | — | — | — |
| PTFE Film + 3% Area Filled Holes | 0.06 | 0.017 | I | 0.06 | 0.022 | I | 0.06~0.11 | 0.10 | I~IV | — | — | — |
| PTFE Film + 5% Area Filled Holes | 0.06 | 0.019 | I | 0.05 | 0.020 | I | 0.06 | 0.05 | I | 0.06 | 0.10 | I |
| PTFE Film + 10% Area Filled Holes | 0.05 | 0.015 | I | 0.06 | 0.022 | I | 0.06 | 0.043 | I | 0.06 | 0.09 | I |
| PTFE Film + 15% Area Filled Holes | 0.05 | 0.014 | I | 0.05 | 0.019 | I | 0.05 | 0.038 | I | 0.06 | 0.08 | I |
| PTFE Film + 30% Area Filled Holes | 0.05 | 0.018 | I | 0.05 | 0.035 | I | 0.05 | 0.08 | I | 0.06 | 0.13 | I |
| PTFE Film + 40% Area Filled Holes | 0.05 | 0.020 | I | 0.05 | 0.048 | I | 0.05 | 0.12 | I | 0.05 | 0.22 | I |
| PTFE Film + 50% Area Filled Holes | 0.05 | 0.050 | I | 0.10 | 0.06 | I | 0.06 | 0.15 | I | 0.06 | 0.28 | I |
| 15% Area Filled Holes + 33% Exposed Metal Mesh | 0.08 | 0.020 | I | 0.09 | 0.030 | I | 0.08 | 0.045 | I | 0.09 | 0.65 | I |

As can be seen from the Table the sliding members which are not PFTE treated make large sliding noises, and the coefficient of friction as well as the wear amounts are large. Incidentally, as to the sliding member in which the PTFE was applied merely on the sliding surface, since the PTFE applied on the surface was worn out when only 230 hrs. had lapsed and the graphite was excessively exposed, making abnormal noise, the test was suspended when the test time period of 300 hrs. had lapsed. Among the PTFE treated sliding members, the one in which the area ratio of the PTFE was 3% made abnormal frictional noise after the lapse of 460 hrs. This is presumed to be because of the fact that the PTFE on the sliding surface was worn out and the powders of the graphite which was generated as a result of the wear covered the surface of the PTFE which had a small area ratios, so mutual friction between the graphite occurred.

Contrarily, the sliding members in which the area ratio of the PTFE was 5 to 50% did not entirely make abnormal frictional noise as apparent from the Table, but on the other hand, as the area ratio of the PTFE increased there arose the disadvantage of an increase in the amount of wear. Therefore, in general an area ratio of the PTFE from 5 to 40% is preferable, and an area ratio from 10 to 30% exhibits the most excellent characteristics. It will be also appreciated from the Table that although the exposure of the metal wires on the sliding surface slightly increases the coefficient of friction, it improves the strength of the sliding surface and increases the wear resistance all the more.

From the foregoing it will be appreciated that the present invention provides a sliding member which is suitable for use under dry frictional conditions over a wide temperature range from room temperature to high temperatures, with no abnormal frictional noise occurring even under these conditions, and exhibits excellent wear properties.

It is also to be understood that although certain forms of this invention have been illustrated and described it is not to be limited thereto except insofar as such limitations are included in the following claims.

What is claimed is:

1. A sliding member comprising a base body made of a firmly entangled and collapsed woven or knitted metal mesh formed of metal fine wires which are provided with voids formed between said metal fine wires, said voids being compactly filled with a heat resistant material, the sliding surface on the outer periphery of said base body being formed into a smooth surface with either a lubricant that fills a number of small holes formed in said heat resistant material as well as covering the surface thereof or with said lubricant and said metal fine wires being exposed on the outer periphery of said base body.

2. The sliding member of claim 1 wherein said metal fine wires are made of at least one metal selected from the group consisting of austenitic or ferritic stainless steel, copper-nickel alloy, copper-nickel-zinc alloy, brass, beryllium copper and aluminum alloy.

3. The sliding member of claim 1 wherein said heat resistant material is made of at least one material selected from the group consisting of expanded graphite, mica and asbestos.

4. The sliding member of claim 1 wherein said lubricants are polytetrafluoroethylene.

5. A method for manufacturing a sliding member comprising the steps of:

(a) preparing a metal mesh as a reinforcing material in a band-like or cylindrical sleeve form by weaving or knitting metal fine wires;

(b) preparing a sheet-like heat resistant material having a definite thickness and formed with a number of small holes in the thickness thereof at given intervals;

(c) applying on one of the surfaces of said sheet-like heat resistant material a lubricant in a given thickness and simultaneously filling said small holes of the same;

(d) positioning said sheet-like heat resistant material applied with said lubricant on said metal mesh so as to result in a band-like laminate;

(e) forming either a rectangular preform by laying said laminate on a pile of other similarly prepared band-like laminates so that said lubricant is directed towards the sliding surface, said other laminates each comprising another metal mesh with heat resistant material applied thereon, or a cylindrical preform by convoluting said band-like laminate itself around a suitable cylindrical material;

(f) introducing said rectangular or cylindrical preform into a metal die, the cavity of which corresponds to the shape and dimension of a final product; and (g) applying pressure to said preform in the direction of said lamination or the axis of said convolution to compress and shape said preform into the final product.

6. The method of claim 5 wherein, in place of said cylindrical preform, a ring-shaped preform is used which is so constructed that said sheet-like heat resistant material is wound around said metal mesh sleeve, resulting in a cylindrical laminate with said laminate being folded back from one end.

7. The method of claim 5 wherein said cylindrical preform is in the form of a first laminate which constitutes the outermost layer acting as a sliding surface, said first laminate including a sheet-like heat resistant material to which a lubricant is applied and a reinforcing material, and a second laminate to be disposed inside said first laminate, said second laminate including a second heat resistant material which is either merely positioned on a reinforcing material, or wherein said second heat resistant material and said reinforcing material are integrally combined together by the application of pressure to become a sheet-like laminate.

8. The method of claim 7 wherein said second heat resistant material is made of expanded graphite, mica or asbestos.

9. The method of claim 5 wherein said metal mesh constituting said reinforcing material is made of a material selected from the group consisting of austenitic or ferritic stainless steel, copper-nickel alloy, copper-nickel-zinc alloy, brass, beryllium copper and aluminum alloy.

10. The method of claim 5 wherein the force to compress said preform within said metal die is from about 2 to 5 t/cm$^2$.

11. The method of claim 5 wherein said sheet-like heat resistant material is sheet-like expanded graphite and said lubricant is polytetrafluoroethylene.

12. The method of claim 11 wherein the thickness of said sheet-like expanded graphite is from about 0.2 to 1.0 mm, and said small holes have respectively a diameter of from about 0.3 to 1.5 mm, whereby the total area of said small holes is from about 5 to 40% of the whole area of said sheet-like expanded graphite.

13. The method of claim 5 wherein the thickness of said lubricant to be applied on said sheet-like heat resistant material is in order of from about $10^{-2}$ to $10^{-1}$ mm.

* * * * *